United States Patent [19]
Wong

[11] Patent Number: 5,848,377
[45] Date of Patent: Dec. 8, 1998

[54] WONG'S ANGLES TO DETERMINE TRAJECTORIES OF OBJECTS

[76] Inventor: Po Kee Wong, 50 Bradley St., Somerville, Mass. 02145

[21] Appl. No.: 117,524

[22] Filed: Aug. 29, 1993

[51] Int. Cl.[6] .................................. G01S 3/00; G01S 5/04
[52] U.S. Cl. ........................ 701/226; 342/357; 342/450; 701/300
[58] Field of Search ..................................... 364/516, 550, 364/556, 560, 561, 578; 340/952, 953, 954; 342/350, 352, 357, 450; 701/200, 213, 214, 207, 225, 226, 300

[56] References Cited

PUBLICATIONS

Massachusetts Inst. of Tech., Lincoln Laboratory, Report #741, Feb. 11, 1986, by L.G. Taff, "Distance Determination via Triangulation".
Tul'skii Politekhnicheskii Institut, Tula, USSR, Geodeziia I Aerofotos'emka, No. 5, 1965, pp. 3–11 (In Russian) by O.S. Razumov.

*Primary Examiner*—Michael Zanelli
*Assistant Examiner*—Edward Pipala

[57] ABSTRACT

A set of three geometric anagles is initiated to track the trajectories of moving objects. The objects to be tracked include but not limit to: satellites, space shuttles, airplanes, missiles moving in aerospace; submarines, ships, fish groups and other moving objects in hydrospace; cars, trucks, trains, human-beings and anmals moving on lands; planet motions in the solar system; particle motions in a controlled experiment in our national labories; contaminants, and hazardous materials in a variety of environmental conditions. All these objects can be detected and monitored by means of various sensing technologies which include seismic, acoustic, electro-magnetic, thermal, chemical, electro-optical and infrared. Mapping and monitoring systems could be deployed in unattended arrays or aboard ground, air, or maritime vehicles.

10 Claims, 2 Drawing Sheets

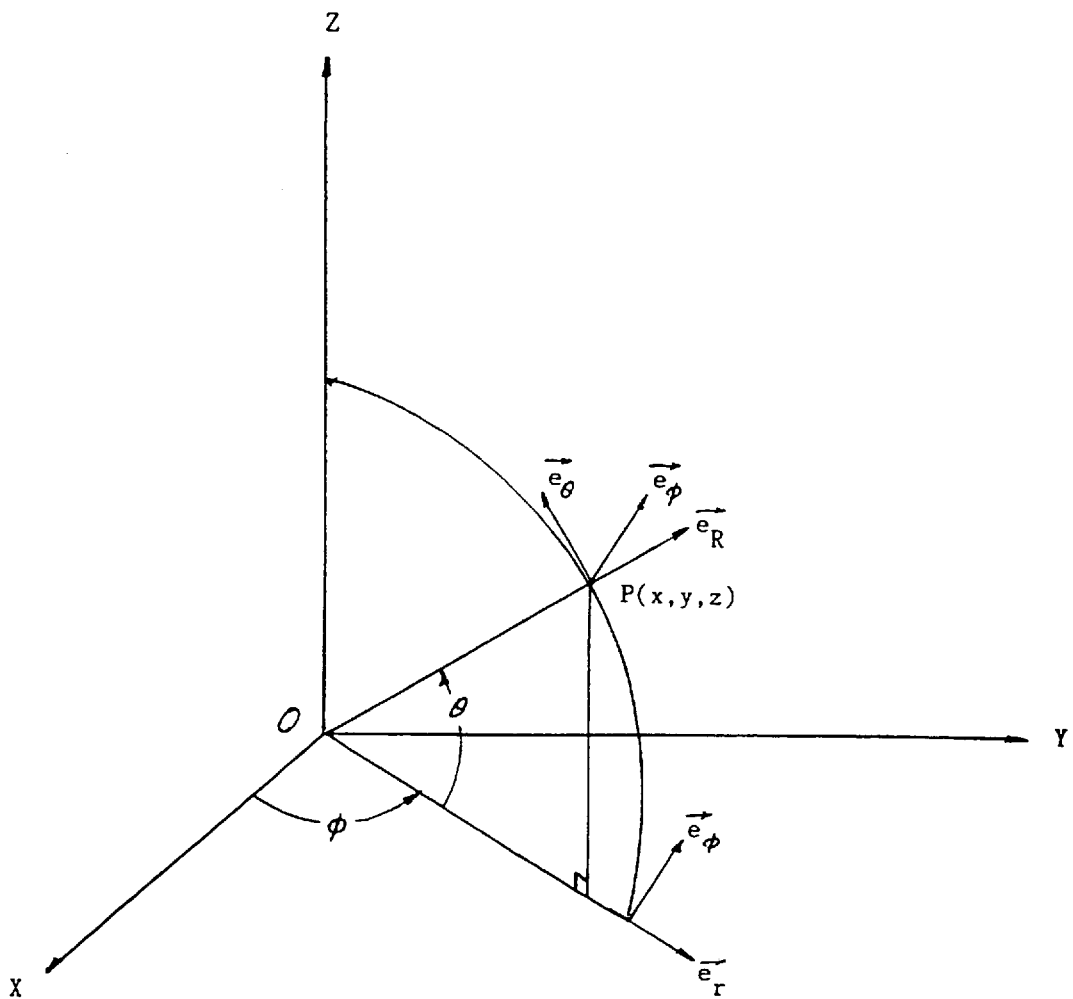
Figure No.1

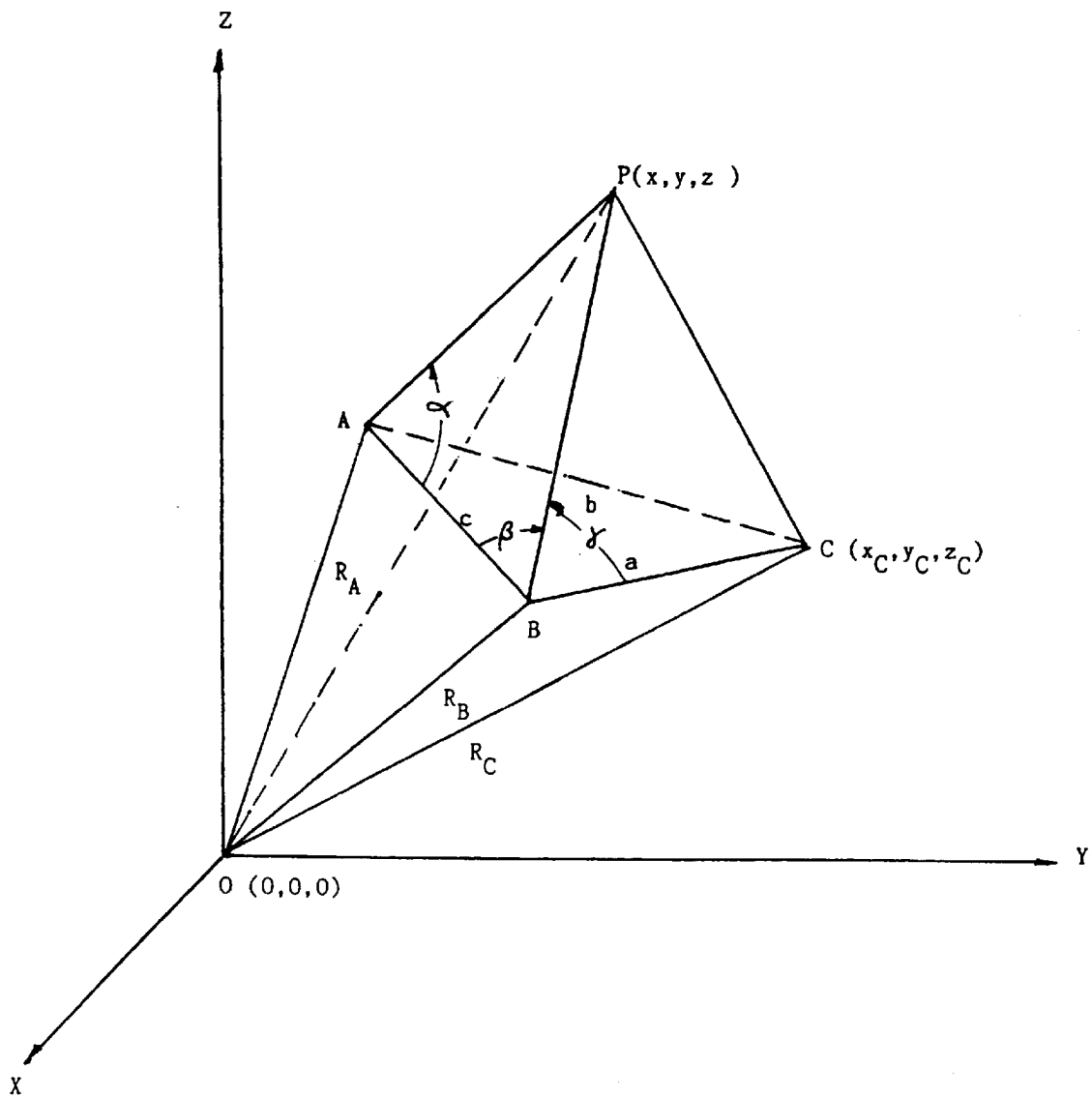
Figure No.2

WONG'S ANGLES TO DETERMINE TRAJECTORIES OF OBJECTS

FIELD OF THE INVENTION

The present invention provides a unique algorithm to determine the real trajectories of moving objects that are under the actions of various force fields. The moving objects include but are not limit to satellites, space shuttles, airplanes, missiles in aerospace; submarines, ships, fish in hydrospace; cars, trucks, trains, tanks on land; planet motions in the solar system; particle motions in a controlled experiment in our national laboratories; human-being and animals and materials in forensic analyses; pollutants, contaminants, and hazardous materials in a variety of environmental conditions; etc. All these objects can be detected and monitored by means of various sensing technologies which include seismic, acoustic, electro-magnetic, thermal, chemical, electro-optical and infrared. Mapping and monitoring systems could be deployed in unattended arrays or aboard ground, air, or maritime vehicles.

BACKGROUND OF THE INVENTION

The tracking of a moving object and determining its trajectory has long been regarded as a part of the famous previously unsolved $P_2$ targeting problem which was proclaimed solved in October 1974 and it became a U.S. Pat. No. : 5,084,232 entitled "TRAJECTORY SOLID ANGLE'S IMPACTS TO PHYSICS AND HIGH TECHNOLOGIES". Recently, the U.S. Army issued a solicitation under the Small Business Innovation Research (SBIR) Program topic No. A93-308 seeking for the solution of a topic entitled "Global Positioning System (GPS) Error Modeling for incorporation into Post-Mission Trajectory Estimation" which is in reality as a part of the $P_2$ targeting problem.

According to abstracts and summaries of reports by relevant scientists, engineers and mathematicians who have been doing research work in (GPS) questions on the accuracy of the (GPS) have been raised.

SUMMARY OF THE INVENTION

The errors, contributed from all previous models as of to date, can be summarized from repeatedly using the following techniques and methods for measurements:

(1) The measurement of the range (distance) between the (GPS) ground station and the (GPS) satellite is by means of either using radars and/or lasers.

(2) The measurement of the range is done from only one (GPS) ground station at a given time and that the geometric and trigonometric laws among the same measurements from the other two stations at the same time have been overlooked. As a result of this, it produces numerous incompatible data and that none of them can be chosen as a standard base for calculation of errors.

It is obvious that the range (distance) measurement by method (1) is affected by all the uncertainties of all physical parameters between the space from the point where the (GPS) satellite is located and to the point where the (GPS) ground station is located. It is also obvious that the measurement by method (2) is not sufficient to describe precisely the trajectory of the (GPS) satellite with respect to the center of the earth, therefore, the true altitude of the (GPS) satellite has always been in question as having been shown by reports in the prior art. Thus, the successive usage of measurement by method (1) and then followed by method (2) will compound all the errors and uncertainties.

In accord with the invention, a unique and original method of measuring the position vector, the velocity vector and the acceleration vector for moving objects including but not limiting the (GPS) satellite has been obtained. This method will be able to reduce the number of uncertainties of both physical and geometric parameters from numerous into only three angles to determine the position vector of the moving object/(GPS) satellite. They are called the Wong's Angles in order to simplify the title of this application and to distinguish from the well-known Euler's Angles which are used to define the position of a rigid body rotating about a fixed point. The combined use of both the Wong's Angles and the Euler's Angles that are set for a spinning satellite will determine not only the trajectory of the center of mass of the satellite but also the trajectory of any point in/on the satellite in rotation about a certain point.

In summary, the advantages of the invention over all other methods in the past to determine the trajectories of moving objects are:

(1) The invention of the Wong's Angles provides the most precise (GPS) satellite position vector that has never been obtained by all other methods as of to date.

(2) All the parameters of uncertainties affecting the position vector of the (GPS) satellite are reduced into the minimum of only 3 Wong's Angles which are measurable with much less uncertainties from the (GPS) ground stations.

(3) It follows that the velocity vector of the (GPS) satellite can be determined from only six parameters which are the 3 Wong's Angles and their 3 first derivatives with respect to time all of which are measurable with much less uncertainties from the (GPS) ground stations.

(4) It follows that the acceleration vector of the (GPS) satellite can also be determined from only 9 parameters which include 3 Wong's Angles; 3 first order time derivatives of the Wong's Angles and 3 second order time derivatives of the Wong's Angles. As a result, the forces acting on the (GPS) satellite can also be determined while the gravitational force acting on the (GPS) satellite is already determined from (2) at any time.

(5) Applying the Wong's Angles to determine the precise position vectors of 3 (GPS) satellites in the space which are formed as a new triangular base to determine other moving objects relative to the 3 (GPS) satellites such that the trajectories of other moving objects can also be determined. This particular application is important to measure objects moving far away from our solar system because the 3 (GPS) ground stations position vectors to the far-distance moving object (for example 1,000 time the radius of the earth) can no longer be distinguished. It is important to choose the proper distance scales for the ground stations as the bases of measurement of the Wong's Angles depending on the type of moving objects which can be airplanes approaching to the airport; submarines moving under-neath the ocean; base ball moving in the ball park . . . etc. Thus, the Wong's Angles are applicable for determination of the trajectories of all moving objects that can be detected and pointed by means of sensing technologies which include seismic, acoustic, electro-magnetic, thermal, chemical, electro-optical and infrared. Its application to determine the precise position vector of the (GPS) satellite is merely one of its numerous applications.

(6) The invention of this set of Wong's Angles can be used to confirm the truth TRAJECTORY SOLID ANGLE (TSA) in U.S. Pat. No. 5,084,232:

(TSA) provides the precise definition of the probability functions for targeting problems in theory.

The Wong's Angles provides a precise method to determine the real trajectories of any objects under the action of many-force fields and to guide the using of the appropriate instruments for measurements in experiments.

Putting both the (TSA) and the Wong's Angles together provides a complete solution of the targeting problem.

(7) Like (TSA), the invention of the Wong's Angles provides the most precise method with the least number of uncertainties (3 angles) for measurements to determine the trajectories of any moving objects relative to the earth. While the use of other methods will compound the errors of measurements.

(8) The definition of the Wong's Angles is explicitly defined with all parameters implicitly contained within the definition while all the other methods do not.

(9) The Wong's Angles appeared in the position vector, the velocity vector and the acceleration vector of the moving object are closed-form analytical solution that provides a good cenceptual and optimal analysis for the trajectory problems to be solved.

(10) Algorithms developed from using the Wong's Angles provide simplified parametric study of computing outputs.

(11) The computing time of the algorithms developed from using the Wong's Angles and their costs will be drastically reduced.

(12) The accuracy and the precision of the numerical values from the algorithms developed from using the Wong's Angles are thus far more better than other approaches.

BRIEF DESCRIPTION OF THE DRAWINGS

FIG. 1 shows a rectangular Cartesian coordinate system about the center of the earth; and FIG. 2 illustrates how Wong's angles are defined with reference to GPS ground stations and a representative moving object.

DETAILED DESCRIPTION OF THE INVENTION

FIG. 1 shows that a rectangular Cartesian coordinate system is set up at the center of the earth. The plane surface XOZ formed by the coordinate axis $\vec{OX}$ and $\vec{OZ}$ cuts through the center of the earth at 0 (0,0,0) and through Greenwich in England. $\vec{OZ}$ is the rotating axis of the earth and it is perpendicular to $\vec{OX}$ axis which is in the plane surface XOY that contains the equator of the earth. Thus, $\vec{OX} \perp \vec{OY} \perp \vec{OZ}$ and $\vec{OX} \cap \vec{OY} \cap \vec{OZ} = 0$ (0,0,0) = the center of the earth. P(x,y,z) represents a point at the center of mass of the moving object/(GPS) satellite relative to the center of the earth. $\vec{OP}$ is the position vector of the moving object/(GPS) satellite. Thus, $\vec{OP} = \vec{R} = x\vec{e}_x + y\vec{e}_y + z\vec{e}_z = R\vec{e}_R$ and $x = R\cos\phi\cos\theta \qquad y = R\sin\phi\cos\theta \qquad z = R\sin\theta$ $R = \sqrt{x^2 + y^2 + z^2} \qquad \phi = \arctan\left(\frac{y}{z}\right) \qquad \theta = \arctan\left(\frac{z}{\sqrt{x^2 + y^2}}\right)$ where $\phi$ is the longitudinal angle and $\theta$ is the latitudinal angle; $\vec{e}_x, \vec{e}_y, \vec{e}_z$ and $\vec{e}_R$ are the unit vectors of $\vec{OX}, \vec{OY}, \vec{OZ}$ and $\vec{OP}$ respectively.

FIG. 2 shows how the Wong's Angles are defined with reference to the locations of the (GPS) ground stations $A(x_A,y_A,z_A); B(x_B,y_B,z_B); C(x_C,y_C,z_C)$ as a triangular base to locate the position of the moving object/(GPS) satellite at point P(x,y,z). Assuming that there is no earthquake at the moment of making measurements, the distances between the (GPS) ground stations and the distances from each (GPS) ground station to the center of the earth are constants without variation with respect to time. Thus, these distances can be determined uniquely from 3-D coordinate geometry as:

$$\overline{OA} = R_A = \sqrt{(x_A^2 + y_A^2 + z_A^2)}$$

$$a = \overline{BC} = \sqrt{(x_C - x_B)^2 + (y_C - y_B)^2 + (z_C - z_B)^2}$$

$$\overline{OB} = R_B = \sqrt{(x_B^2 + y_B^2 + z_B^2)}$$

$$c = \overline{AB} = \sqrt{(x_A - x_B)^2 + (y_A - y_B)^2 + (z_A - z_B)^2}$$

$$\overline{OC} = R_C = \sqrt{(x_C^2 + y_C^2 + z_C^2)}$$

$$b = \overline{AC} = \sqrt{(x_A - x_C)^2 + (y_A - y_C)^2 + (z_A - z_C)^2}$$

The set of Wong's Angles determing the position P(x,y,z) of the moving object/(GPS) satellite from the FIG. 2 are clearly marked and defined as:

$\alpha = \angle PAB \quad \beta = \angle PBA \quad \gamma = \angle PBC$

It is obvious that the Wong's Angles vary with the moving object/(GPS) satellite.

Certain details of the invention can be found with reference to U.S. Pat. No. 5,084,232, incorporated herein by reference, and with reference to Appendix A hereto. These details are summarized as follows: The range (distance) from the moving object/(GPS) satellite P to the (GPS) ground station B is $$\overline{PB} = \frac{\sin\alpha}{\sin(\alpha + \beta)} c$$

The range (distance) from the moving object/(GPS) satellite P to the (GPS) ground station A is $$\overline{PA} = \frac{\sin\beta}{\sin(\alpha + \beta)} c$$

The range (distance) from the moving object/(GPS) satellite P to the (GPS) ground station C is $$\overline{PC} = \sqrt{a^2 + \overline{PB}^2 - 2a\overline{PB}\cos\gamma} =$$

$$\sqrt{a^2 + \frac{\sin^2\alpha}{\sin^2(\alpha + \beta)} c^2 - \frac{2ac\sin\alpha\cos\gamma}{\sin(\alpha + \beta)}}$$

The components of the position vector of the moving object/(GPS) satellite are:

$x = x_B + (x_o - Mz_o)\overline{PB}$
$y = y_B + (y_o - Nz_o)\overline{PB}$
$z = z_B + z_o\overline{PB}$ where:

$z_o = [(Mx_o + Ny_o) \pm$ $\sqrt{(Mx_o + Ny_o)^2 + (M^2 + N^2 + 1)(1 - x_o^2 - y_o^2)}\,]/(M^2 + N^2 + 1)$ -continued $x_o = [(y_C - y_B)c\cos\beta - (y_A - y_B)a\cos\gamma]/\Delta$
$y_o = [(x_A - x_B)a\cos\gamma - (x_C - x_B)c\cos\beta]/\Delta$
$\Delta = [x_A(y_C - y_B) + x_B(y_A - y_C) + x_C(y_B - y_A)]$
$M = [z_A(y_C - y_B) + z_B(y_A - y_C) + z_C(y_B - y_A)]/\Delta$
$N = [x_A(z_C - z_B) + x_B(z_A - z_C) + x_C(z_B - z_A)]/\Delta$ Notice that $z_o$ has two values for a given set of Wong's Angles. Taking the positive sign for the radical term means that the moving object/(GPS) satellite is above the geometric plane formed by the (GPS) ground stations A,B and C. Taking the negative sign for the radical term means that the moving object/(GPS) satellite is underneath the geometric-plane surface formed by the (GPS) ground stations A,B and C. In fact, the position vector obtained by taking the positive sign and that with the negative sign represent the object point and its image point reflected with symmetry about the geometric-plane surface formed by the (GPS) ground stations A,B and C. The perpendicular from the moving object/(GPS) satellite to the geometric-plane surface ABC is d which can be obtained as:

$$d = \frac{\sqrt{(Mx_o + Ny_o)^2 + (M^2 + N^2 + 1)(1 - x_o^2 - y_o^2)}}{\sqrt{M^2 + N^2 + 1}} \overline{PB}$$

Please note that this perpendicular d is entirely different from the altitude h of the moving object/GPS satellite which is formally defined as the difference between R ( distance from the center of the earth to the moving object) and $R_o$ ( average or sea level radius of the earth=6,378 km.). Thus $h = R - R_o$.

The gravitational acceleration of the moving object/(GPS) satellite in the direction of $\vec{e}_R$ toward to the center of the earth is g which can be expressed as:

$$g = g_o \frac{R_o^2}{R^2} \quad (g_o = 9.8 \text{ m/s}^2 = .0098 \text{ km/s}^2 \text{ at the sea level})$$

As a result, both the velocity vector $\vec{v}$ and the acceleration vector $\vec{a}$ of the moving object/(GPS) satellite can also be obtained respectively as:

$$\vec{v} = \frac{d\vec{R}}{dt} = \dot{\vec{R}} \qquad \vec{a} = \frac{d^2\vec{R}}{dt^2} = \ddot{\vec{R}}$$

What is claimed is:

1. A process of locating a moving object relative to earth, comprising the steps of:
   sensing the object through electro-magnetic or electro-optical means;
   selecting three ground stations on earth, each ground station having unique coordinates, relative to the earth's center, of altitude, longitude and latitude;
   processing, by three-dimensional coordinate geometry, distances (a) between the three ground stations and (b) between the center and each of the three ground stations;
   calculating Wong's angles for each of the ground stations to the sensed object;
   obtain, by trigonometry, a range from the moving object to each of the ground stations, the range being defined in terms of the Wong's angles and of the distances;
   obtain a position vector defined by the Wong's angles and the distances;
   specifying an altitude of the moving object by taking a difference between the position vector and the earth's radius;
   defining, by Newton's gravitational law, a gravitational acceleration of the moving object in terms of the Wong's angles;
   determining object velocity by taking a first derivative of position vector with respect to time;
   determining object acceleration by taking a second derivative of the position vector with respect to time;
   predicting object trajectory in terms of a trajectory solid angle; and
   locating the object at a predetermined time following the step of sensing the object.

2. A method according to claim 1, wherein the step of selecting three ground stations comprises assigning Cartesian coordinate positions as points $A(x_A, y_A, z_A)$, $B(x_B, y_B, z_B)$, and $C(x_C, y_C, z_C)$, where A,B and C represent Cartesian coordinate (x,y,z) positions for the stations relative to the earth's center.

3. A method according to claim 2, wherein the step of determining distances between the center and each of the ground stations comprises calculating $$\sqrt{(x_A^2 + y_A^2 + z_A^2)} \;,$$
$$\sqrt{(x_B^2 + y_B^2 + z_B^2)} \;, \text{ and}$$
$$\sqrt{(x_C^2 + y_C^2 + z_C^2)}$$

for points A,B and C, as earth's center is located at point 0,0,0.

4. A method according to claim 3, wherein the step of determining distances between the three ground stations comprises calculating.

$$\sqrt{(x_C - x_B)^2 + (y_C - y_B)^2 + (z_C - z_B)^2} \;,$$
$$\sqrt{(x_A - x_B)^2 + (y_A - y_B)^2 + (z_A - z_B)^2} \;,$$
and
$$\sqrt{(x_A - x_C)^2 + (y_A - y_C)^2 + (z_A - z_C)^2} \;.$$

5. A method according to claim 1, wherein the step of determining the Wong's angles comprises defining a triangular base for the ground stations as points $A(x_A, y_A, z_A)$, $B(x_B, y_B, z_B)$, and $C(x_C, y_C, z_C)$, where A,B and C represent Cartesian coordinate (x,y,z) positions for the stations relative to the earth's center, and determining angles $\alpha$, $\beta$ and $\gamma$ as $\angle PAB$, $\angle PBA$, and $\angle PBC$, respectively, where P represents a Cartesian coordinate position of the moving object relative to the earth's center.

6. A method according to claim 5, wherein the step of determining a range comprises calculating $$\frac{\sin\alpha}{\sin(\alpha + \beta)} c, \; \frac{\sin\beta}{\sin(\alpha + \beta)} c,$$
and -continued $$\sqrt{a^2 + \frac{\sin^2\alpha}{\sin^2(\alpha+\beta)}c^2 - \frac{2ac(\sin\alpha)(\cos\gamma)}{\sin(\alpha+\beta)}}.$$

where c defines distance between stations at A and B, and where a defines distance between stations at B and C.

7. A method according to claim 6, wherein the step of determining a position vector comprises calculating $$x = x_B + (x_o - Mz_o)\overline{PB}$$
$$y = y_B + (y_o - Nz_o)\overline{PB}$$
$$z = z_B + z_o\overline{PB}$$

where:

$$z_o = [(Mx_o + Ny_o) \pm$$

$$\sqrt{(Mx_o + Ny_o)^2 + (M^2 + N^2 + 1)(1 - x_o^2 - y_o^2)}\,]/(M^2 + N^2 + 1)$$

$$x_o = [(y_C - y_B)c\cos\beta - (y_A - y_B)a\cos\gamma]/\Delta$$
$$y_o = [(x_A - x_B)a\cos\gamma - (x_C - x_B)c\cos\beta]/\Delta$$
$$\Delta = [x_A(y_C - y_B) + x_B(y_A - y_C) + x_C(y_B - y_A)]$$
$$M = [z_A(y_C - y_B) + z_B(y_A - y_C) + z_C(y_B - y_A)]/\Delta$$
$$N = [x_A(z_C - z_B) + x_B(z_A - z_C) + x_C(z_B - z_A)]/\Delta$$

8. A method according to claim 1, wherein the moving object comprises a GPS satellite.

9. A method according to claim 1, wherein the ground stations are GPS ground stations.

10. A method of locating a GPS satellite relative to earth, comprising the steps of:

sensing the satellite through electro-magnetic or electro-optical means;

selecting three GPS ground stations on earth, each ground station having unique coordinates, relative to the earth's center, of altitude, longitude and latitude;

processing, by three-dimensional coordinate geometry, distances (a) between the three GPS ground stations and (b) between the center and each of the three ground stations;

calculating Wong's angles for each of the GPS ground stations to the satellite;

obtain, by trigonometry, a range from the satellite to each of the ground stations, the range being defined in terms of the Wong's angles and of the distances;

obtain a position vector defined by the Wong's angles and the distances;

determining an altitude of the satellite by taking a difference between the position vector and the earth's radius;

defining, by Newton's gravitational law, a gravitational acceleration of the satellite in terms of the Wong's angles;

determining satellite velocity by taking a first derivative of the position vector with respect to time;

determining satellite acceleration by taking a second derivative of the position vector with respect to time;

predicting the trajectory of the satellite in terms of a trajectory solid angle; and locating the satellite at a predetermined time following the step of sensing the satellite.

* * * * *